US008387065B2

(12) United States Patent
Arimilli et al.

(10) Patent No.: US 8,387,065 B2
(45) Date of Patent: Feb. 26, 2013

(54) SPECULATIVE POPCOUNT DATA CREATION

(75) Inventors: Ravi K. Arimilli, Austin, TX (US);
Ronald N. Kalla, Round Rock, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/425,343

(22) Filed: Apr. 16, 2009

(65) Prior Publication Data
US 2010/0269118 A1 Oct. 21, 2010

(51) Int. Cl.
  *G06F 9/46* (2006.01)
  *G06F 9/45* (2006.01)
  *G06F 9/30* (2006.01)
  *G06F 9/40* (2006.01)

(52) U.S. Cl. ........ 718/105; 717/149; 717/151; 717/153; 717/159; 712/215

(58) Field of Classification Search .................. 718/105
  See application file for complete search history.

(56) References Cited

U.S. PATENT DOCUMENTS

| | | | | |
|---|---|---|---|---|
| 4,989,168 | A | | 1/1991 | Kuroda et al. |
| 5,511,172 | A | * | 4/1996 | Kimura et al. ............... 712/235 |
| 6,006,317 | A | * | 12/1999 | Ramagopal et al. .......... 712/23 |
| 6,029,212 | A | * | 2/2000 | Kessler et al. ................ 710/52 |
| 6,070,237 | A | | 5/2000 | Peleg et al. |
| 6,167,524 | A | * | 12/2000 | Goodnow et al. ............ 713/300 |
| 6,185,668 | B1 | * | 2/2001 | Arya ............................ 712/23 |
| 7,996,662 | B2 | * | 8/2011 | Lien et al. .................... 712/244 |
| 2002/0194184 | A1 | * | 12/2002 | Baskins et al. .............. 707/100 |
| 2005/0050534 | A1 | * | 3/2005 | Luk et al. .................... 717/159 |
| 2009/0172370 | A1 | * | 7/2009 | Butler ......................... 712/234 |

OTHER PUBLICATIONS

Robert Owen Jackson, "Heterogeneous Computer Architecture Progress Report", Aug. 22, 1996, pp. 6 and 47-49.*
Chang et al., "Automatic I/O Hint Generation through Speculative Execution," Proceedings of the 3rd Symposium on OS Design and IMplementation, Feb. 1999.*
Gonzalez et al., "Speculative Execution via Address Prediction and Data Prefetching," ICS 97.*
Goldstein et al., "PipeRench: A reconfigurable architecture and compiler", Apr. 2000, Computer Magazine IEEE.*

* cited by examiner

*Primary Examiner* — Lewis A Bulllock, Jr.
*Assistant Examiner* — Kevin X Lu
(74) *Attorney, Agent, or Firm* — Yudell Isidore Ng Russell PLLC

(57) ABSTRACT

A method and a data processing system by which population count (popcount) operations are efficiently performed without incurring the latency and loss of critical processing cycles and bandwidth of real time processing. The method comprises: identifying data to be stored to memory for which a popcount may need to be determined; speculatively performing a popcount operation on the data as a background process of the processor while the data is being stored to memory; storing the data to a first memory location; and storing a value of the popcount generated by the popcount operation within a second memory location. The method further comprises: determining a size of data; determining a granular level at which the popcount operation on the data will be performed; and reserving a size of said second memory location that is sufficiently large to hold the value of the popcount.

19 Claims, 5 Drawing Sheets

SEPCULATIVE POPCOUNT INSTRUCTION (SPI)
300

| EA$_{SRC}$ (SRC) 305 | EA$_{DST}$ (DST) 307 | CNT (NO. BYTES) 309 | Granularity 311 | POPCOUNT INSTRUCTION/DATA OPERANDS 321 | EA facility 313 |

POPCOUNT DATA AND POPCOUNT FACILITY

SPECULATIVE POPCOUNT DATA CREATION

GOVERNMENT RIGHTS

This invention was made with Government support under DARPA, HR0011-07-9-002. THE GOVERNMENT HAS CERTAIN RIGHTS IN THIS INVENTION.

BACKGROUND

1. Technical Field

The present invention relates generally to data processing systems and in particular to the data manipulation within a data processing system. Still more particularly, the present invention relates to an improved apparatus and method of performing data operations with within a data processing system that reduces the utilization of critical processor cycles.

2. Description of the Related Art

Improving the performance and robustness of processors and the speed of data processing within processors is an ongoing goal in processor development. One recent development in processor technology involves the introduction of power performance computing (PowerPC®) and its corresponding reduced instruction set architecture. While several new instructions have been provided to support this new processor system, there exist several operations held over from previous implementations of processor architecture, which operations tend to be performed at relatively "slow" speeds on the PowerPC, while utilizing critical processor cycles and bandwidth, and causing reductions in the overall performance of the processes requiring the results of the operations.

One such operation, which incurs a measurable latency when performed by the PowerPC® is that of population count. Population count (or popcount, as the process is conventionally referred to) involves a processor or other specialized circuit counting the number of 1 bits within a block of data (e.g., a 32-bit word) that has been stored to memory. The popcount is typically triggered by a special popcount instruction which is received by the processor during processing of fetched instructions of an executing thread. The result of the popcount operation may be utilized for any series of more advanced data manipulations. Typically, popcounts are calculated at the time the popcount instruction is received, and the time for completion of the calculation may hamper the completion speed of the advanced processes. Unlike with prior art implementations in which a specialized dedicated circuit performs the popcount operation, most conventional processing devices perform popcounts via the processor executing the popcount instruction and triggering one or more of the processor's execution units to perform the popcount operation on the selected data. U.S. Pat. No. 4,989,168 for example, provides a method by which the multiplying unit in a computer system is utilized to perform the population counting operation. Other mechanisms and methods for performing such popcounts are generally known and applied.

One of the inherent issues with conventional popcount operations being completed by the execution units is the increased latency seen by the processors as the size of data increases with the increase in processing capabilities. Additionally, popcount operations today occur in real time on the processor, i.e., at the time the popcount instruction is retrieved by the instruction sequencer and placed in the execution units of the processor. The processor execution units then have to process this tedious, sequential calculation (e.g., an iterative summation) on the sample data to generate the popcount. This process tends to utilize significant amounts of the processors critical cycles and bandwidth. This real time processing of the popcount operation tends to tied up processing bandwidth in the processor's Fixed Point Units (FXUs) leading to latency and/or delays with the other processing functions as the popcount operation is pipelined through the FXUs.

SUMMARY OF ILLUSTRATIVE EMBODIMENTS

Disclosed are a method, a processor, and a data processing system by which data operations for which a result of the operation is determined from an analysis of the actual data themselves (i.e., without requiring addition data manipulation) are speculatively performed as background processes before the operations are requested in order to reduce the utilization of critical processor resources (cycles and bandwidth) and latency incurred when the operation is later encountered in the processing stream. In one embodiment, a data population count (popcount) operation is speculatively preformed at the time the data is created (or generated) and is being stored to memory. The method is performed within a data processing system having a processor and a memory, and the method comprises: identifying data to be stored to memory for which a popcount may need to be determined; speculatively performing a popcount operation on the data as a background process of the processor while the data is being stored to memory; storing the data to a first memory location; and storing a value of the popcount generated by the popcount operation within a second memory location. In one embodiment, the method further comprises determining a size of the data; determining a granularity at which the popcount operation on the data will be performed; and reserving a size of said second memory location that is sufficiently large to hold the value of the popcount at that granularity.

In one embodiment, the method includes providing a speculative popcount instruction to the instruction set architecture to speculatively initiate the popcount operation, wherein an early execution of the speculative popcount instruction improves processor performance and robustness of the processor for data analytics and for fixed point, bit based algorithms. The speculative performance of the popcount operation also removes the latency of the calculation which would be required during real time processing, while freeing up critical processor cycles and bandwidth for other processor tasks.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
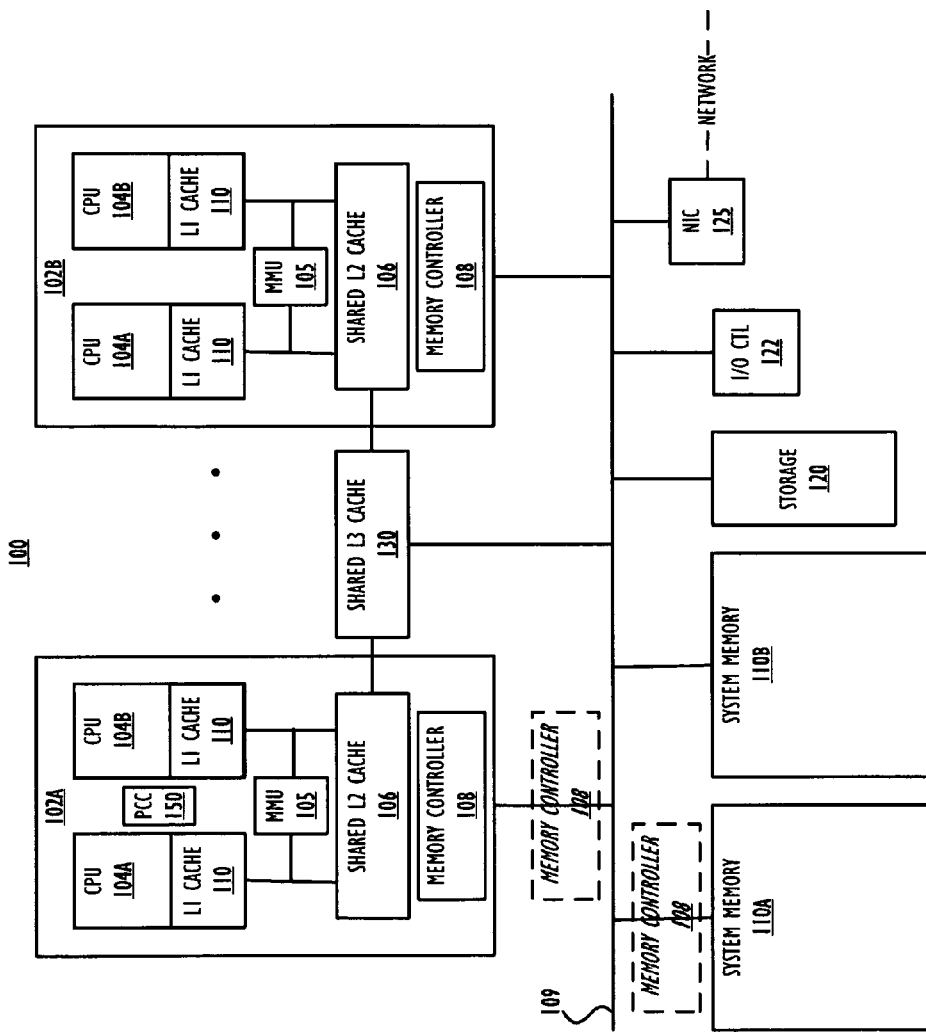
FIG. 1 a block diagram of a data processing system, within which various features of the invention may advantageously be implemented, according to one embodiment of the invention.

The illustrative embodiments provide a method, a processor, and a data processing system by which data operations for which a result of the operation is determined from an analysis of the actual data themselves (i.e., without requiring addition data manipulation) are speculatively performed as background processes before the operations are requested in order to reduce the utilization of critical processor resources (cycles and bandwidth) when the operation is later encountered in the processing stream.

Generally, the embodiments provide a method performed within a data processing device having a processor and a memory coupled to the processor. The method is implemented by the processor and involves reducing latency and substantially eliminating utilization of critical processing resources to complete introspective data operations involving introspective analyses of functional characteristics associated with generated and stored data. The method comprises: identifying generated data that includes one or more functional characteristics that are determinable via introspective analysis of the data, where the functional characteristics may be required during later processing; speculatively performing the introspective analyses of the data to retrieve the one or more functional characteristics, wherein the speculative performing occurs at a time prior to processor receipt of a request to perform the introspective data operations and during periods of low usage of critical processor resources; storing the data in a memory location for future access; storing the one or more determined functional characteristics of the data within a second memory location; and when a request is later received at the processor to determine the functional characteristics of the data, forwarding the one or ore determined functional characteristics from the second memory location to the processor, wherein the latency of performing the introspective analyses is substantially reduced and wherein utilization of critical processor resources to perform the introspective analyses on demand is substantially eliminated. The processor resources include processor execution cycles and processor, data bus, and memory bandwidth.

In one embodiment, a data population count (popcount) operation is speculatively preformed at the time the data is created (or generated) and is being stored to memory. The method is performed within a data processing system having a processor and a memory, and the method comprises: identifying data to be stored to memory for which a popcount may need to be determined; speculatively performing a popcount operation on the data as a background process of the processor while the data is being stored to memory; storing the data to a first memory location; and storing a value of the popcount generated by the popcount operation within a second memory location. In one embodiment, the method further comprises determining a size of the data; determining a granularity at which the popcount operation on the data will be performed; and reserving a size of said second memory location that is sufficiently large to hold the value of the popcount at that granularity.

In one embodiment, the method includes providing a speculative popcount instruction to the instruction set architecture to speculatively initiate the popcount operation, wherein an early execution of the speculative popcount instruction improves processor performance and robustness of the processor for data analytics and for fixed point, bit based algorithms. The speculative performance of the popcount operation also removes the latency of the calculation which would be required during real time processing, while freeing up critical processor cycles and bandwidth for other processor tasks.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, introspective data operations refer to any operation where the result of the operation is determined by evaluating the data itself, i.e., no additional operands are required other than the data. The invention is primarily described from the perspective of a popcount operation, which is one type of introspective data operation. However, the functionality associated with the described embodiment are applicable to many other types of (introspective) operations, whether simple or complex. Key to the implementation of the invention is the ability of the speculative operation to be performed by the processor in the background and early, before the demand for the result is received. This advanced processing is key because the demand for the result of the introspective processing typically occurs when the result/information is needed by another process. Performing the introspective operation at that time then leads to latency in completing the ultimate process as well as cause an undesired utilization of critical processing cycles and/or bandwidth. The operations are stated to be speculative because the operation is performed before the processor actually knows if the result will be needed by a later demand. At worst case, a small amount of memory is utilized to store the result of the operation; However, the primary processing performed by the processor continues without stops to execute these introspective operations, which occur in the background, and which occur only when resources are available, in one embodiment.

With reference now to the figures, FIG. 1 depicts a block diagram representation of an example data processing system, within which the invention is advantageously implemented. DPS 100 comprises at least one processor chip 102 (although two chips are shown in a Symmetric Multiprocessor—SMP-configuration) having two central processing units (CPUs) 104 (or processors). CPUs 104 are connected to a memory subsystem, which includes on-chip L1 cache 110 (combination data cache and instruction cache or bifurcated caches) and shared lower level (L2) cache 106, and off-chip L3 cache 130 and system memory 110. Access to the various caches is controlled by one or more memory management units (MMU) 105. System memory 115 couples to processor chip 102 via a system interconnect 110 (e.g., a switch or bus). Data storage and other operations on/with system memory 115 are controlled/managed in part memory controller 108, which may be located at one of multiple locations within the DPS 100. As shown, in a first embodiment, memory controller 108 may be located on chip. In other embodiments, memory controller 108 (illustrated with dashed lines) may be located off the processor chip at one or more locations. In the illustrative embodiment, processor chip 102 is a dual core design (with two CPUs on-chip) and the L1 cache may be an eight-way set-associative design with a two-stage pipeline supporting two independent 32-bit reads or one 64-bit write per cycle. Different configurations of processor chips and memory components and/or hierarchy are also supported by the invention.

Illustrated within processor chip 102 is popcount circuit 150, which evaluates popcount values, in one circuit-based popcount embodiment. However, it is appreciated that the illustrated popcount circuit is not necessarily provided on-chip with the CPU 105. Further, it is likely that DPS 100 may not actually have a separate circuit for completing popcount evaluations, but may complete the popcount operation via executable instruction code.

Also connected to system bus 110 is storage 120, which may stage instructions and data to memory that are utilized during processor execution. I/O controller 122 is also illustrated and provides connectivity and control for input devices and output devices (not specifically shown). DPS 100 is also illustrated with network interface controller (NIC) 125, by which DPS 100 may connect to one or more other devices via an external network. DPS 100 may comprise many other component or peripheral devices and software modules, which are not shown or described herein, as these components/devices/modules are not required for implementation of the inventive concept, which primarily involves processing operations on/with data that occur at the processor level and memory level.

Figure 2:
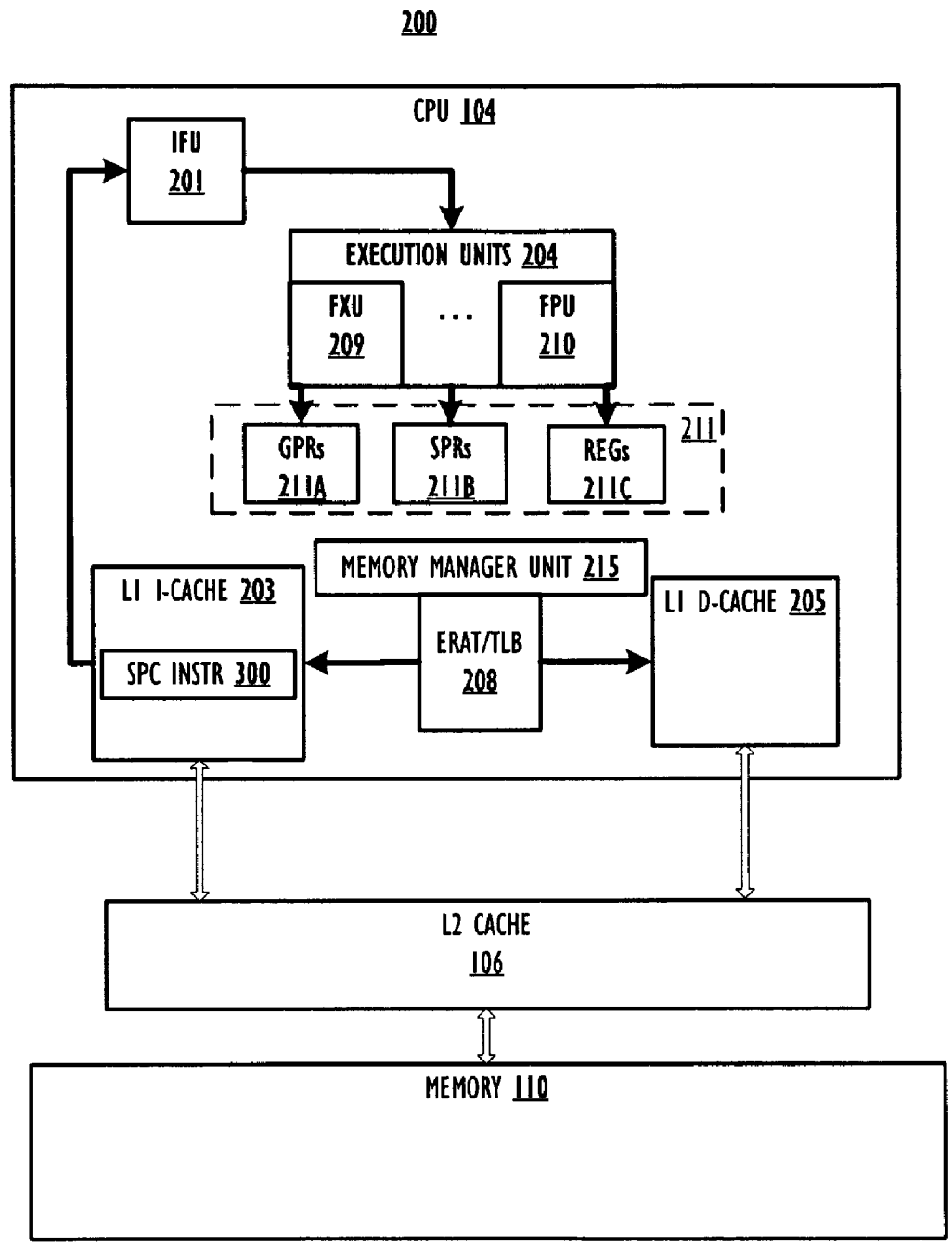
FIG. 2 is a block diagram showing internal logic components of a processor which executes the speculative popcount operation, in accordance with one embodiment of the invention.

Referring now to FIG. 2, there is illustrated a more detailed illustration of an example CPU 104 and memory subsystem within which several of the features described herein are implemented. CPU 104 comprises L1 instruction cache (I-cache) 203 and L1 data cache (D-cache) 205 and associated translation look-aside buffer (TLB) 208 and MMU 215. CPU also comprises an instruction fetch unit (or instruction sequencer) 201, which stages instructions to a set of execution units 204, of which fixed point unit (FXU) 209 and floating point unit (FPU) 210 are presented. Data and other operands generated during execution by the execution units are held within a series of registers 211, including general purpose registers (GPRs), special purpose registers (SPRs) and the like. In one embodiment, CPU 104 includes a series of registers, including 32 (or some other number multiple of 2) general purpose registers (GPRs) 211A, which are utilized by the FXU 209 to complete certain types of operations execution, including population counting.

Within L1 I-cache 203 is speculative popcount instruction 300, whose execution by one or more of the execution units 204 (e.g., FXU 209) triggers the background counting of the number of 1 bits within a sequence of fixed sized data to which the SPI corresponds. In one embodiment, one or more of the execution units, together with the registers and other processor components, which may not be shown, collectively perform the functions related to retrieval, manipulation, and storage of data at the processor level. These data functions/operations are initiated based on received instructions of an executing application/code. With the configuration of DPS, multiple applications may execute in an overlapping manner on CPU 105, and in one embodiment, each application provides one or more threads of executable instructions that are executed by the processing units. The instructions, such as speculative popcount instructions (SPIs) are instructions which are supported within an instruction set architecture that is supported by CPU 104.

Those of ordinary skill in the art will appreciate that the hardware components and basic configuration depicted in FIGS. 1 and 2 may vary. The illustrative components within DPS 100 and CPU 105 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Figures 3A, 3B:
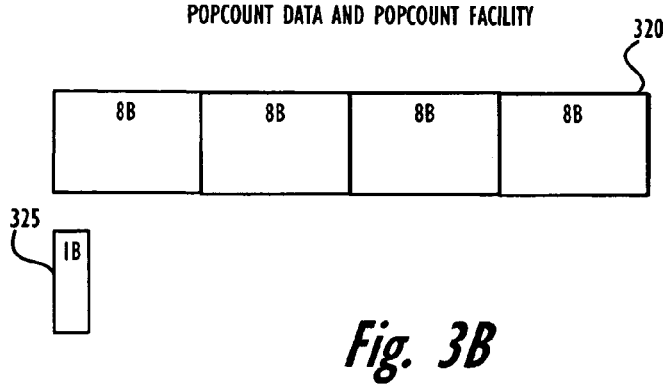
FIG. 3A illustrates an example speculative popcount instruction, in accordance with one embodiment of the invention.
FIG. 3B illustrates examples of a popcount data block and corresponding popcount facility that holds the popcount value, in accordance with one embodiment of the invention.

According to one embodiment, and as illustrated b FIG. 3A the instruction set architecture is modified to include and support the generation (during compilation or thereafter) and execution of a speculative popcount instruction. Speculative popcount instruction (SPI) 300 comprises first addressing information (source EA field 305) that indicates a first location from which the data is retrieved (assuming an initial retrieval of data). Speculative popcount instruction (SPI) 300 also comprises second addressing information (destination EA field 307) that indicates a first location within the system memory in which the popcount data is to be stored. Speculative popcount instruction also includes count (or number of bytes) field 309, by which the size of the data being stored is provided to the processor. In one embodiment, speculative popcount instruction 300 also comprises granularity information 311 by which the CPU (or compiler) knows which granularity to apply to the popcount operation. Speculative popcount instruction may also include address information (EA facility field 313) for the popcount facility such that the processor is able to quickly retrieve the popcount value when the value is later requested. This address may, in on embodiment, be maintained within one of the GPRs of CPU 104. Also, SPI 300 may be a basic instruction that triggers the processor to retrieve the required information to complete the popcount from a pre-set location such as one of the GPRs. Thus, when encountered by the CPU (104) within the execution stream, speculative popcount instruction triggers the processor to initiate a popcount operation on the identified data that is about to be stored to memory. CPU 104 then initiates the popcount operation utilizing available background processing bandwidth, without affecting or stopping the ongoing operations scheduled for completion by the execution stream.

CPU 104 thus performs the popcount operation in the background, and before the actual popcount value is needed for other processing.

An actual method or mechanism by which the popcount is calculated is not described herein because the invention applies to any one of the various popcount algorithms that may be executed by CPU to determine a popcount. For example, execution of the speculative popcount instruction may trigger a first embodiment in which a branch-free function for popcount is utilized, or a second embodiment in which one of branching popcount code sequence or an alternative popcount code sequence is utilized. Alternatively, in another embodiment in which a specialized popcount circuit/component is provided within DPS 100, the speculative popcount instruction may trigger the specialized popcount circuit/component to calculate the popcount ahead of time (i.e., speculatively).

In one embodiment, the speculative popcount instruction is generated by the compiler based on a store operation which stores a particular set of generated data, whose popcount is likely to be requested during subsequent processing/execution. In yet another embodiment, the speculative popcount instruction is coded into the instruction stream ahead of the time the popcount would actually be needed and during low processing cycles of the application so that the popcount operation can proceed ahead of schedule in the background, without taking up significant bandwidth and causing increased processor latency at the tie the popcount value is actually required.

With reference now to FIG. 3B, there are illustrated an example popcount data 320 consisting of 4×8 Byte blocks of data (or a 32B block of data), and corresponding popcount facility, which is 1 Byte wide. The popcount facility 325 is a few orders of magnitude smaller than the size of popcount data 320. The relative size of the popcount facility is predetermined as a design feature of the CPU or determined on the fly during compilation or execution of the speculative popcount instruction, and the size is based on the size of the data represented within each bit of the popcount facility.

Figure 4A:
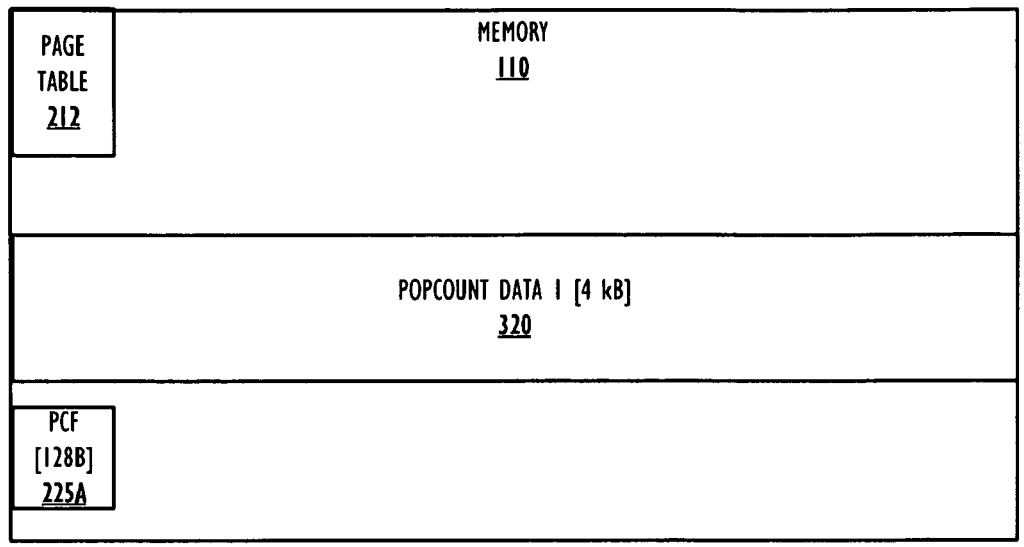
FIGS. 4A and 4B are block diagram representations of system memory, with specific allocations of blocks of memory for pop count data and for a popcount value, according to one embodiment of the invention.
Figure 4B:
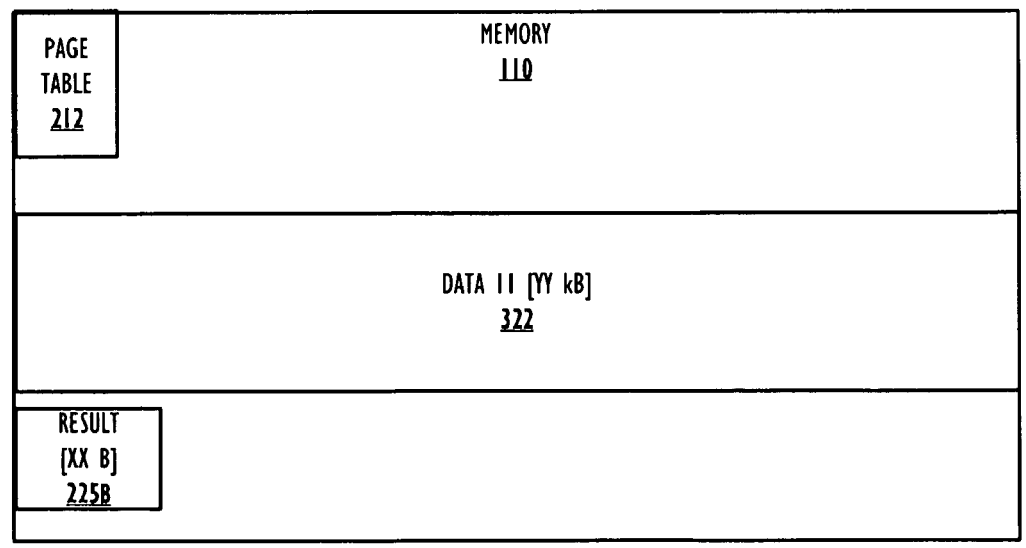

When a popcount operation is performed, the processor forwards the popcount data (or triggers the issuance of the popcount data from a first location, such as in the L2 cache 106) as well as the popcount value to the system memory 110, where the data is stored until later required. FIGS. 4A and 4B illustrates two examples of system memory 110 with entries at specific memory locations for popcount data and corresponding popcount values. System memory 110 includes a page table 312 by which the physical locations allocated to specific real addresses are stored for future look-up during data storage and retrieval. As depicted, system memory 110 stores popcount data 320 within a first memory location having a real address (RA) corresponding to the destination effective address (EA) of the data store operation for which the speculative popcount operation is triggered. Also provided within memory is popcount facility (PCF) 325, which, as explained below, may be of varying size depending on the data granularity selected for the popcount operation (i.e., the number of bytes of data represented by each bit in the popcount value).

Thus, the actual size of the popcount facility is variable, and is determined based on one or more of: (a) the application code (as determined during (a1) compilation by the compiler of the application code or as (a2) specifically coded with the popcount instruction being executed), (b) pre-programmed or pre-designed granularity of the processor, (c) on the fly selection by the processor based on (c1) resource availability (limited memory or processor resource results in much larger granularity, and vice versa), (c2) size of the popcount data being stored, or some other mechanism for determining an appropriate granularity of the popcount operation. With this determination completed, the memory controller is able to determine space allocation for the popcount facility as well as the popcount data. In one embodiment, the processor utilizes a granularity which assigns a 1B popcount facility to every 32 bytes of data. Within the memory illustrations of FIG. 4A, for example, first popcount data 320 is assumed to be a 4 kB block of data. With this first illustration of system memory and using the 1B to 32B ratio of popcount facility size to size of data, a popcount facility capable of holding 128B entries is required (i.e., 4096/32 =128B). When the processes of the invention are applied generally (i.e., not to speculatively track popcount), then the memory illustration of FIG. 4B becomes a bit more variable, as the facility for holding the result of the operation on the data 322 will vary based on the size (YY) of the data 322, the type of operation being performed, and other possible factors. This data 322 of size YY will require a facility of XX size, where both YY and XX are integer variables.

Figure 5:
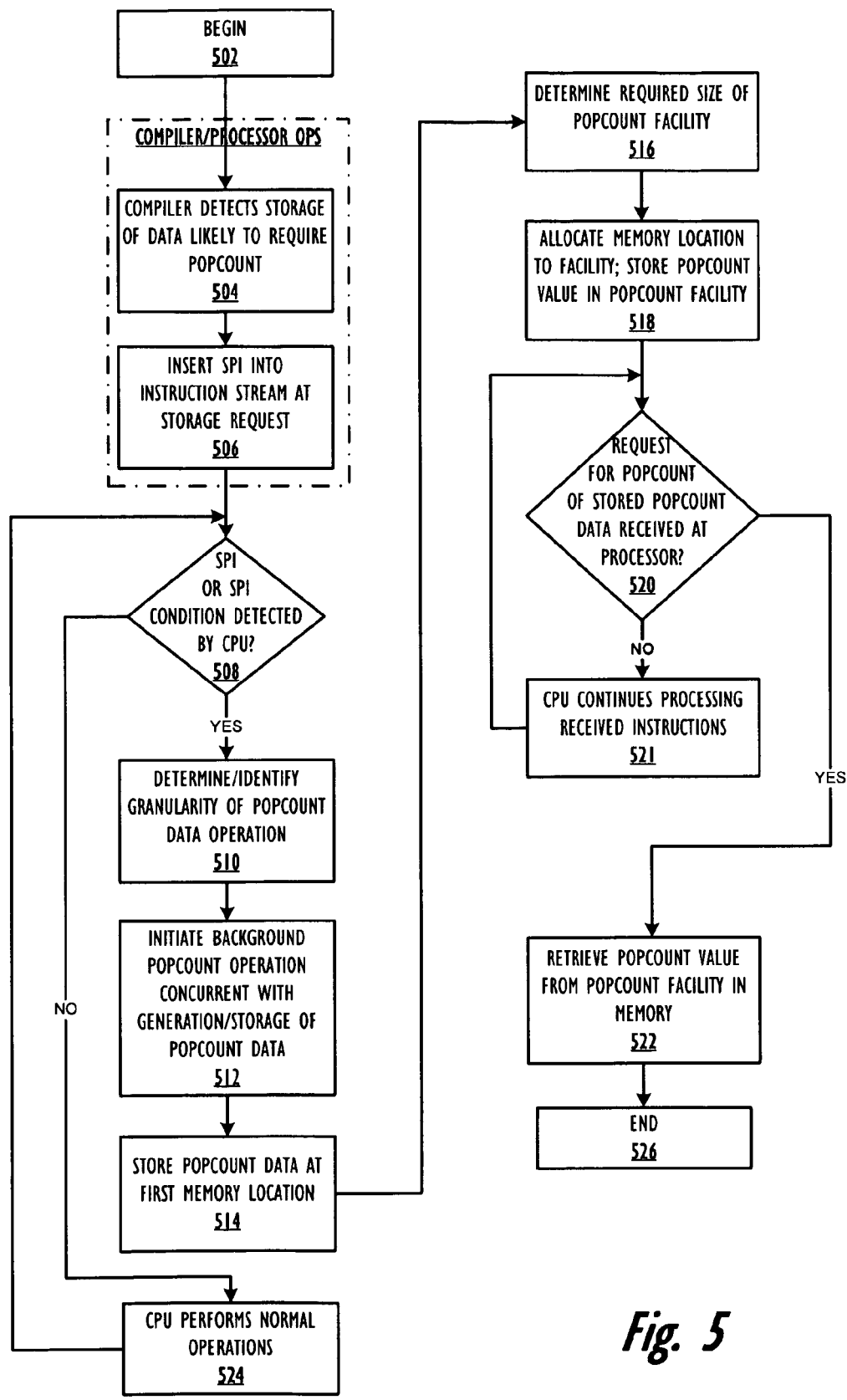
FIG. 5 is a flow chart illustrating the method by which the processor/compiler implements the speculative popcount operation, in accordance with one embodiment of the invention.

FIG. 5 is a flow chart illustrating various methods by which the above processes of the illustrative embodiments are completed. Although the method illustrated in FIG. 5 may be described with reference to components shown in FIGS. 1-4B, it should be understood that this is merely for convenience and alternative components and/or configurations thereof can be employed when implementing the various methods. Key portions of the described methods may be completed by CPU 104 executing specialized popcount instructions within DPS 100 (FIG. 1) and controlling specific operations of memory and other components within DPS 100, and the methods are thus described from the perspective of CPU 104 and DPS 100. The initial sequence of steps presented by the method is assumed to be completed by the compiler of the DPS 100.

The process of FIG. 5 begins at initiator block 502 and proceeds to block 504, at which a compiler of the DPS detects program code/instructions to store data within an instruction sequence, where the compiler is able to determine that the stored data will likely required a popcount be taken at a later processing time. The compiler generates a speculative popcount instruction and inserts the speculative popcount instruction within the instruction stream for the compiled program, as shown at block 506. The compiler inserts the SPI ahead of or substantially concurrent with the data storage operation which stores the popcount data to system memory. At block 508, the CPU checks a received instruction and/or evaluates a received sequence of instructions from the instruction stream to determine whether the SPI or a sequence of instructions that trigger an SPI is detected. If no SPI or SPI condition is detected, the CPU processes the received instructions as regular instructions within the execution stream, as shown at block 524. However, if the CPU detects an SPI or an SPI triggering condition, the CPU determines (or identifies) the granularity required for the popcount data operation, at block 510. The CPU then initiates the background popcount operation concurrent with the generation and/or storage of the popcount data, as provided at block 512. The popcount data is stored at a first memory location at block 514. At block 516, the processor and/or memory controller determines the size (i.e., number of bits) required for the popcount facility that holds the popcount value. The popcount facility is then allocated and the popcount value is stored within the popcount facility, at block 518.

At decision block 520 a check is made whether a request for the popcount for the stored data has been received at the processor. Since the popcount operation was speculatively performed ahead of the time at which the popcount would likely be requested, this check is likely to be an on-chip check by the processor of one or more GPRs for a match of the address corresponding to the data for which the popcount was speculatively calculated. If no request is received, the processor continues processing instructions within the normal flow of processes, as shown at block 521. In one embodiment, the processor may provide a timeout condition whereby failure by the processor to receive a popcount request for the stored data within a pre-set number of cycles causes the processor to issue a recapture request to allow the memory within the popcount facility to be re-utilized for later assignment of data and/or assignment of another popcount value. However, if at block 520 the request is detected for the popcount (e.g., request address matches address in GPRs of the stored popcount data), the processor issues a request to retrieve the popcount value from the popcount facility, whose memory address is maintained within one of the GPRs, as shown at block 522. The process then ends at block 526.

In the flow chart above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method implemented by a data processing device having a processor and a memory coupled to the processor, wherein utilization of critical processor resources to perform an introspective analysis on demand is reduced and a latency of performing introspective analyses is reduced, the method comprising:

invoking a compiler to:
detect, within an instruction sequence, one or more program instructions for storing one or more data;
determine that the one or more data that will be stored by a program instruction of the one or more program instructions will likely require an introspective analysis be performed at a later processing time; and
in response to determining that the one or more data will likely require performing the introspective analysis:
generate one or more speculative introspective operations operable on the one or more data; and
insert the one or more speculative introspective operations into the instruction sequence at a point in the instruction sequence before the one or more program instructions for storing data, so as to form an augmented instruction sequence, wherein resultant values of the one or more introspective operations can be subsequently requested by the processor during later processing of the one or more data; and invoking the processor to:

detect, within the augmented instruction sequence, the one or more speculative introspective operations;

store the one or more data in a first memory location for future access;

perform the one or more speculative introspective operations to determine one or more resultant values, wherein the speculative introspective operations are perform as a background process while other processes continue to execute on the processor and at a time-prior to receiving a request to perform the one or more introspective operations, and wherein the speculative introspective operations are perform concurrently with storing the one or more data;

store the determined one or more resultant values of the speculative introspective operations to a second memory location; and retrieve the determined one or more resultant values of the speculative introspective operations from the second memory location in response to the processor receiving a request for the one or more speculative introspective operations.

2. The method of claim 1, wherein the processor is invoked to perform the one or more speculative introspective operations as a background process during periods in which critical processor resources are not fully utilized, wherein the critical processor resources include processor execution cycles and processor, data bus, and memory bandwidth.

3. The method of claim 1, wherein the introspective operations are population count (popcount) operations, said method comprising:

determining when a popcount operation within the one or more data will be required for future processing;

concurrently with a storage of the one or more data in the first memory location, initiating the popcount operation on the one or more data to determine a popcount value of the one or more data; and storing the popcount value within the second memory location.

4. The method of claim 3, further comprising:

determining a size of the popcount value;

determining a granularity at which the popcount operation on the one or more data will be performed; and reserving a block of memory at the second memory location that is sufficiently large to hold the popcount value.

5. The method of claim 3, further comprising:

detecting, from a requesting component, a later-in-time request to calculate the popcount value; and responsive to detecting the later-in-time request:

retrieving the popcount value from the second memory location; and forwarding the popcount value to the requesting component, wherein a latency of calculating the popcount value in real time following receipt of the request is substantially eliminated.

6. A non-transitory machine-readable storage device having program code that when executed by a processor provides a method implemented by the processor for reducing latency and substantially eliminating utilization of critical processing resources to complete introspective operations, the program code comprising code for:

invoking a compiler to:

detect, within an instruction sequence, one or more program instructions for storing one or more data;

determine that the one or more data that will be stored by a program instruction of the one or more program instructions will likely require an introspective analysis be performed at a later processing time; and in response to determining that the one or more data will likely require performing the introspective analysis:

generate one or more speculative introspective operations operable on the one or more data; and insert the one or more speculative introspective operations into the instruction sequence at a point in the instruction sequence before the one or more program instructions for storing data, so as to form an augmented instruction sequence, wherein resultant values of the one or more introspective operations can be subsequently requested by the processor during later processing of the one or more data; and invoking the processor to:

detect, within the augmented instruction sequence, the one or more speculative introspective operations;

store the one or more data in a first memory location for future access;

perform the one or more speculative introspective operations to determine one or more resultant values, wherein the speculative introspective operations are perform as a background process while other processes continue to execute on the processor and at a time-prior to receiving a request to perform the one or more introspective operations, and wherein the speculative introspective operations are perform concurrently with storing the one or more data;

store the determined one or more resultant values of the speculative introspective operations to a second memory location; and retrieve the determined one or more resultant values of the speculative introspective operations from the second memory location in response to the processor receiving a request for the one or more speculative introspective operations.

7. The non-transitory machine-readable storage device of claim 6, wherein the program code includes code that invokes the processor to perform the one of more speculative introspective speculative operations as a background process during periods in which critical processor resources are not fully utilized, wherein the critical processor resources include processor execution cycles and processor, data bus, and memory bandwidth.

8. The non-transitory machine-readable storage device of claim 6, wherein the introspective operations are population count (popcount) operations, said program code comprising code for:

determining when a popcount operation within the one or more data will be required for future processing;

concurrently with a storage of the one or more data in the first memory location, initiating the popcount operation on the one or more data to determine a popcount value of the one or more data; and storing the popcount value within the second memory location.

9. The non-transitory machine-readable storage device of claim 8, said program code further comprising program code for:
determining a size of the popcount value;
determining a granularity at which the popcount operation on the one or more data will be performed; and
reserving a block of memory at the second memory location that is sufficiently large to hold the popcount value.

10. The non-transitory machine-readable storage device of claim 8, said program code further comprising code for:
detecting, from a requesting component, a later-in-time request to calculate the popcount value; and
responsive to detecting the later-in-time request:
retrieving the popcount value from the second memory location; and
forwarding the popcount value to the requesting component,
wherein a latency of calculating the popcount value in real time following receipt of the request is substantially eliminated.

11. A data processing device comprising:
a processor;
a memory coupled to the processor; and
processing logic associated with the processor that implements a method for reducing latency and substantially eliminating utilization of critical processing resources to complete introspective data operations, the processing logic comprising logic that:
invokes a compiler to:
detect, within an instruction sequence, one or more program instructions for storing one or more data;
determine that the one or more data that will be stored by a program instruction of the one or more program instructions will likely require an introspective analysis be performed at a later processing time; and
in response to determining that the one or more data will likely require performing the introspective analysis:
generate one or more speculative introspective operations operable on the one or more data; and
insert the one or more speculative introspective operations into the instruction sequence at a point in the instruction sequence before the one or more program instructions for storing data, so as to form an augmented instruction sequence, wherein resultant values of the one or more introspective operations can be subsequently requested by the processor during later processing of the one or more data;
invokes the processor to:
detect, within the augmented instruction sequence, the one or more speculative introspective operations;
store the one or more data in a first memory location for future access;
perform the one or more speculative introspective operations to determine one or more resultant values, wherein the speculative introspective operations are perform as a background process while other processes continue to execute on the processor and at a time-prior to receiving a request to perform the one or more introspective operations, and wherein the speculative introspective operations are perform concurrently with storing the one or more data;
store the determined one or more resultant values of the speculative introspective operations to a second memory location; and
retrieve the determined one or more resultant values of the speculative introspective operations from the second memory location in response to the processor receiving a request for the one or more speculative introspective operations.

12. The data processing system of claim 11, wherein the processing logic performs the speculatively introspective analysis as a background process during periods in which critical processor resources are not fully utilized, wherein the critical processor resources include processor execution cycles and processor, data bus, and memory bandwidth.

13. The data processing system of claim 11, wherein the introspective operations are population count (popcount) operations, said processing logic comprising logic that:
determines when a popcount operation within the one or more data will be required for future processing;
concurrently with a storage of the one or more data in the first memory location, initiates the popcount operation on the one or more data to determine a popcount value of the one or more data; and
stores the popcount value within the second memory location.

14. The data processing system of claim 13, said processing logic further comprising logic that:
determines a size of the popcount value;
determines a granularity at which the popcount operation on the one or more data will be performed; and
reserves a block of memory at the second memory location that is sufficiently large to hold the popcount value.

15. The data processing system of claim 13, sad processing logic further comprising logic that:
detects, from a requesting component, a later-in-time request to calculate the popcount value; and
responsive to detecting the later-in-time request:
retrieves the popcount value from the second memory location; and
forwards the popcount value to the requesting component, wherein a latency of calculating the popcount value in real time following receipt of the request is substantially eliminated.

16. The method of claim 4, wherein a size of the block of memory at the second memory location is further determined based on one or more of:
a specified size provided by a popcount operation;
an identified size provided by an executing application;
a pre-programmed granularity of the processor; and
an on the fly selection by the processor based on one of resource availability and a size of a popcount value being stored.

17. The method of claim 3, wherein the speculatively popcount operation is initiated by providing a speculative popcount instruction to an instruction set architecture of the processor.

18. The non-transitory machine-readable storage device of claim 6, wherein
a size of a block of memory at the second memory location is further determined based on one or more of a specified size provided by a popcount operation, an identified size provided by an executing application, a pre-programmed granularity of the processor, and an on the fly selection by the processor based on one of resource availability and a size of the popcount data being stored; and
the popcount operation is initiated by providing a speculative popcount instruction to an instruction set architecture of the processor.

19. The data processing system of claim 11, wherein
a size of a block of memory at the second memory location is further determined based on one or more of a specified size provided by the popcount operation, an identified size provided by an executing application, a pre-programmed granularity of the processor, and an on the fly selection by the processor based on one of resource availability and a size of the popcount data being stored; and the popcount operation is initiated by providing a speculative popcount instruction to an instruction set architecture of the processor.

* * * * *